Dec. 5, 1950  D. RUNYEN  2,533,050
TRAILER STEP
Filed Aug. 24, 1949
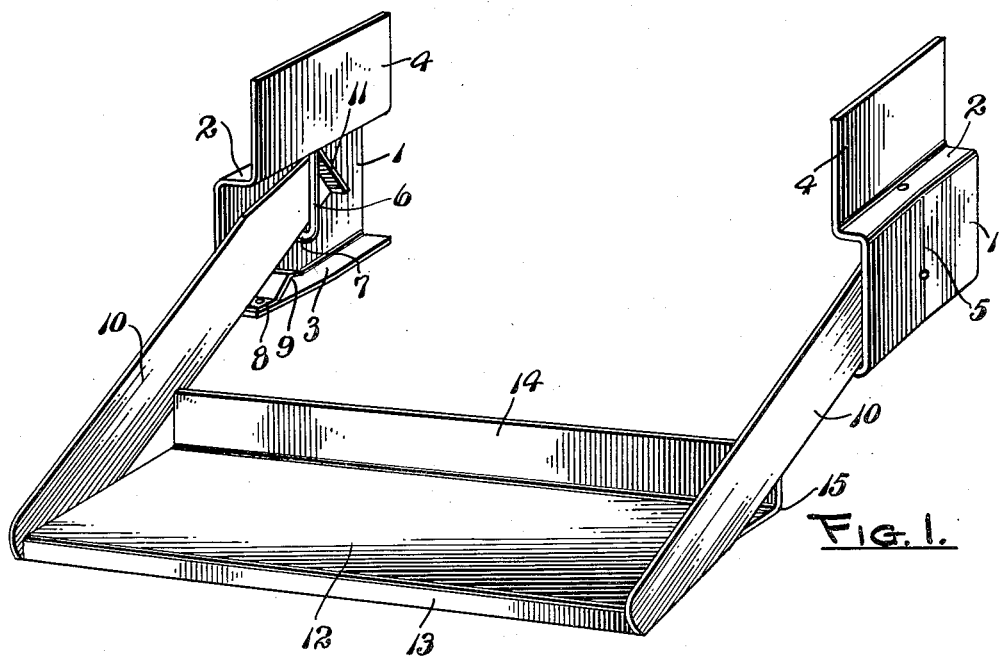
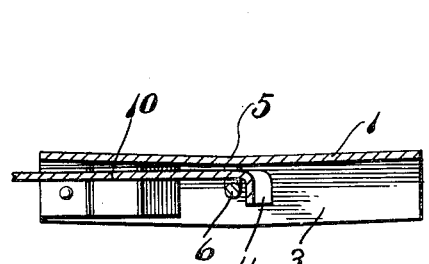
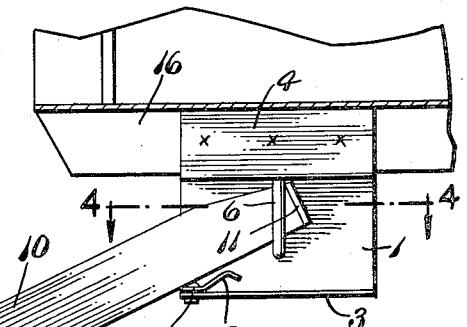
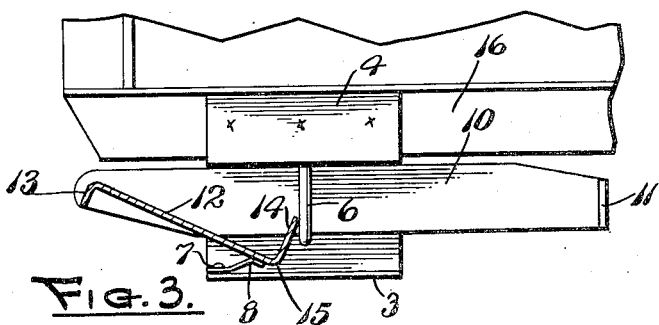
INVENTOR
DAVID RUNYEN
BY Liverance and
Van Antwerp
ATTORNEYS Patented Dec. 5, 1950

2,533,050

UNITED STATES PATENT OFFICE 2,533,050

TRAILER STEP

David Runyen, Grand Rapids, Mich.

Application August 24, 1949, Serial No. 112,024

9 Claims. (Cl. 280—166)

This invention relates to and is concerned with a novel, sturdy, practical and effective trailer step designed for attachment to a house trailer and located below a door therein. When the trailer is on the road it is retracted underneath the bottom or floor of the trailer and out of the way. When a destination is reached, or when the trailer is used as housing accommodations, the step is outwardly withdrawn and automatically takes its operative position, outwardly from and below the lower end of a door, in which position it may be stepped upon in passing through the door of the trailer either outward or inward. Such steps are desirable in trailers as the bottoms or floors of trailers are or may be located at a sufficiently high distance from the ground that stepping to and from the trailer is not easily done, while with the step of my invention entrance into or departure from the trailer is made easy.

I have heretofore filed an application having Serial No. 97,420, filed June 6, 1949, now abandoned. The present invention is a continuation in part of such prior application with some changes and improvements therein, and will take the place of the earlier application.

The trailer step of my invention has for its object and purpose the provision of a novel, amply sturdy and durable structure, which is economical to produce and which is easily retracted to its underneath position below the bottom or floor of the trailer, and is held and maintained in such position and secured against rattling while the trailer is being moved, but which also is quickly or almost instantly extended, and upon such extension automatically lowered to its operative position when it is to be used.

An understanding of the invention may be had from the following description, taken in connection with the accompanying drawing, in which Fig. 1 is a perspective view of a complete trailer step of my invention, Fig. 2 is a transverse vertical section through the trailer step between its opposite sides, with the step in extended operative position and illustrated as attached underneath the bottom or floor of the trailer.

Fig. 3 is a like vertical section with the trailer step retracted and securely but yieldingly held in position and kept from rattling, and Fig. 4 is a fragmentary somewhat enlarged horizontal section, substantially on the plane of line 4—4 of Fig. 2.

Like reference characters refer to like parts in the different figures of the drawing.

In the structure disclosed, two spaced brackets for mounting the trailer step are provided, formed from flat metal in generally channel form, each having a vertical web 1, an upper horizontal flange 2 and a lower horizontal flange 3. From the inner edge of the upper flange 2 a plate 4 may be continued upwardly. It is, however, to be understood that brackets will be made both with the upper extension plate 4 and without such plates. The brackets are designed to be secured at the under side of the bottom of a trailer. In some cases they are secured by bolts passing through the upper flanges 2, and in other cases by electric welding the vertical extension plates 4 to sides of cross sills of the under frame of the trailer.

The brackets are bent or sprung between their ends so that the middle portions of the webs 1 extend inwardly, as indicated at 5, and the inner sides of the webs diverge outwardly from a vertical plane as best shown in Fig. 4, there being what may be termed high points at 5 between the ends of the webs 1 at such inwardly bent or pressed portions.

A guide or rod form has a vertical section 6 and a lower end portion bent outwardly therefrom at right angles to provide a short horizontal section 7. One of such guides is permanently secured to each bracket, substantially midway between its ends and opposite the high point 5 of the web thereof. The section 6 is vertically positioned and at the upper end welded or otherwise permanently securely connected with the upper flange 2. The horizontal lower section 7 extends to and through the web 1 and is welded or otherwise permanently secured being located a distance above the lower flange 3. The vertical section 6 is thus spaced a short distance from and is parallel to the adjacent web 1.

At the upper side of the lower flange 3 and adjacent its outer end a flat spring catch is permanently secured, its outer end 8 being fastened by a rivet or other equivalent at the outer end of the lower flange 3, and the free inwardly extending portion 9 extending upwardly for a distance at an angle to the horizontal and then downwardly in a terminal short section.

The two brackets and described guides and catches when connected and spaced from each other on a trailer body, serve to support and guide the inwardly and outwardly movable step. Two spaced sides or arms 10 of flat metal are used. At the inner end of each an inwardly turned lip or lug 11 is provided. Between the outer end portions the immediate step portion is permanently secured by welding. It includes a generally horizontal tread 12, which, at its front edge, has an integral downwardly turned short reinforcing flange 13, and at its inner longitudinal edge an upwardly turned longer vertical flange 14, there being a right angle bend 15 between the rear flange 14 and the tread 12. The ends of the tread 12 and of the flange 13 and parts of the ends of the rear flange 4 come against and are permanently welded to the sides 10, in effect being integral with such sides.

The step thus provided may be extended outwardly until stopped by the lugs 11 coming against the vertical rod portions 6 of the guides, and with lower edges of the sides 10, between their ends, bearing upon the outer ends of the lower flanges 3 of the brackets. This is the operative position of the step, as shown in Fig. 2, it being shown as permanently mounted upon under cross sills 16 of a trailer frame, the vertical plates 4 of the brackets having the welded connections thereto. In such position the step is out from the side of the trailer and immediately above in the side of the trailer the door for getting into and out of the trailer is positioned.

When the step is retracted to the position shown in Fig. 3, the sides 10 of the trailer step are guided inwardly upon the horizontal sections 7 of their guides until the right angle bend at 15 between the tread 12 and the rear upwardly extending flange 14 comes to the spring catches 9, which will yield downwardly for the immediate step to ride thereover and then the catches press against the bottom of the tread 1, the flange 14 at its ends pressing against the vertical sections 6 of the guides. This provides a yielding connection of the movable trailer step to the brackets and guides which insures against the trailer step working loose from road shocks or the like when moving over the road, and also prevents rattling noises. Because of the bending of the brackets vertically between their ends there is no danger of any binding or sticking of the sides 10 of the step in their inward and outward movements as the contact against the brackets will be only line contacts with an elimination of frictional binding.

The structure described is particularly sturdy and durable. The cost of manufacture is low, the operation is simple and easy, and the attachment to a trailer is readily accomplished. It is usually done at the factory where the trailer is built.

The invention is defined in the appended claims and is to be considered comprehensive of all forms of structure coming within their scope.

I claim:

1. A trailer step structure comprising, two brackets adapted to be secured spaced from each other at the under side of a trailer, each bracket being of channel form in cross section having upper and lower horizontal flanges and a vertical web connecting the flanges, a guide having a vertical portion secured at its upper end to each of said upper flanges and extending downwardly therefrom toward the lower flange, having a horizontal outwardly extending section at its lower end permanently secured to said web a distance above the lower flange, an arm slidably mounted over said horizontal section of the guide and between each web and the vertical section of the guide, stop means at the inner end of each arm extending therefrom to come against the vertical portion of its associated guide when said arms are extended outwardly, and a step tread extending between outer ends of said arms permanently secured thereto.

2. A structure as defined in claim 1, each of said arms comprising an elongated plate of flat metal located in a vertical plane, said stop means at the inner end of each arm comprising an integral inwardly extending lug disposed substantially at right angles to the length of its associated arm.

3. A structure as defined in claim 1, each of said arms comprising an elongated plate of flat metal located in a vertical plane, and the web of each of said brackets being bent inwardly at an intermediate portion between its ends, to provide a vertically positioned high point from which, toward each end of the web, said web diverges outwardly, said high points being substantially opposite the vertical sections of said guides.

4. A trailer step structure comprising, two brackets adapted to be secured at the under side of a trailer in spaced horizontal relation, said brackets at their upper portions having means for permanent connection to and underneath the trailer, and each including a vertical web and an inwardly extending supporting means at the lower outer portion of said web, a vertical guide permanently secured to each bracket having a vertical section spaced inwardly from said web and a horizontal section connected with the lower end of the vertical section extending outwardly and connected to said web between the upper and lower edges of the web, two elongated arms of flat metal slidably mounted between said webs and the vertical sections of said guides and having their lower edges above the horizontal sections of the guides, stop means at the inner ends of the arms adapted to come against the vertical portions of said guides to limit the outward movements of the arms, said arms at their lower edges in outer position resting at their lower edges upon said supporting means of said brackets and bearing at their inner ends and upper edges against said trailer connecting portions of the brackets, and a step tread extending between the outer end portions of the arms and permanently secured thereto, said step tread in outer position being adapted to occupy a generally horizontal position.

5. A structure as defined in claim 4, said step tread being of flat metal and having at its forward edge a downwardly extending flange, and at its rear edge an upwardly extending flange, the ends of said flanges being permanently secured to the arms.

6. A trailer step structure comprising, two brackets adapted to be located horizontally underneath a trailer and connected thereto, each having a vertical web and upper and lower horizontal inwardly extending flanges, a trailer step comprising two spaced arms and a tread between the outer ends of said arms permanently connected thereto, means on the webs of said brackets for slidably guiding said arms inwardly and outwardly thereon, stop means carried at the inner ends of the arms engaging said guiding means for the arms at the outer position of said arms and tread, said guide means being located above the lower flanges of the brackets and a yielding catch fixed on the upper side of the lower flange of a bracket extending upwardly into the path of movement of said tread when it is moved inwardly to engage therewith and hold said tread and attached arms yieldingly against outward movement.

7. A structure as defined in claim 6, said tread at its longitudinal rear edge having a flange extending therefrom upwardly substantially at right angles to the tread, and said catch comprising a member of flat spring metal located above the outer end portion of the lower flange of the bracket with which it is associated and at its outer end, means permanently securing said catch at its outer end to the outer end portion of said flange, said catch at its free end portion extending upwardly and at an angle to the horizontal for a short distance and terminating in a downwardly and rearwardly extending terminal section, the upper extending free end portion of said catch being located in the inward path of movement of the junction of said tread and flange thereon whereby the catch is depressed until it is passed by said junction and presses against the under side of the inner portion of the tread and holds said flange against said guides.

8. A trailer step structure comprising, two spaced horizontally located brackets adapted to be secured spaced from each other at the under side of a trailer, each bracket being of channel form having a vertical web and upper and lower horizontal flanges extending toward the flanges of the other bracket, a guide for each bracket comprising a vertical section secured at its upper end and spaced inwardly from the adjacent web of each bracket and extending toward the lower flange thereof and terminating in a horizontal section secured at its outer end to said web of its associated bracket and connected with the lower end of the vertical section, two arms of flat metal located each in a vertical plane slidable between said guides and the webs and upper flanges of the brackets, stop means carried by the inner ends of the arms to engage against said guides on outward movement of the arms to their extreme position, and a generally horizontal step tread extending between the outer ends of said arms permanently connected therewith.

9. A structure as defined in claim 8, and a spring catch carried by each bracket engageable against said tread when said arms are at the inner position for yieldingly holding said tread and arms against outward movement and preventing rattling thereof against said guides and brackets.

DAVID RUNYEN.

REFERENCES CITED

The following references are of record in the file of this patent:

UNITED STATES PATENTS

| Number | Name | Date |
|---|---|---|
| 1,148,356 | Chickering | July 27, 1915 |
| 2,153,945 | Thelander | Apr. 11, 1939 |
| 2,487,660 | McCann | Nov. 8, 1949 |
| 2,492,068 | Schofield et al. | Dec. 20, 1949 |